(12) United States Patent
Weikel et al.

(10) Patent No.: US 7,382,891 B2
(45) Date of Patent: Jun. 3, 2008

(54) MODULAR PERSONAL AUDIO SET AND SYSTEM

(75) Inventors: Raymond Weikel, Camas, WA (US); William McClelland, Vancouver, WA (US)

(73) Assignee: Logitech Europe S.A., Romanel-Sur-Morges (CH)

( * ) Notice: Subject to any disclaimer, the term of this patent is extended or adjusted under 35 U.S.C. 154(b) by 0 days.

(21) Appl. No.: 10/979,735

(22) Filed: Nov. 1, 2004

(65) Prior Publication Data

US 2005/0215111 A1  Sep. 29, 2005

Related U.S. Application Data

(60) Provisional application No. 60/517,223, filed on Oct. 31, 2003.

(51) Int. Cl.
*H04R 25/00* (2006.01)

(52) U.S. Cl. .................. 381/384; 381/375; 381/378

(58) Field of Classification Search .............. 381/60, 381/322, 324, 327–330, 381, 382, 384; 181/129, 181/130, 135; 439/350, 352, 353, 542, 620.22
See application file for complete search history.

(56) References Cited

U.S. PATENT DOCUMENTS

| | | | |
|---|---|---|---|
| 176,069 A * | 4/1876 | Ryder | ........................ 439/350 |
| 5,333,177 A | 7/1994 | Braitberg et al. | |
| 5,613,222 A | 3/1997 | Guenther | |
| 5,847,541 A | 12/1998 | Hahn | |
| 6,198,821 B1 * | 3/2001 | Yang | .......................... 379/430 |
| 6,304,638 B1 | 10/2001 | Coulter et al. | |
| 6,542,757 B2 | 4/2003 | Bae | |
| 6,961,440 B1 * | 11/2005 | Schlaegel | ................... 381/382 |
| 2002/0146987 A1 * | 10/2002 | Maden | ........................ 455/90 |
| 2003/0013500 A1 | 1/2003 | Dunoff et al. | |
| 2003/0198355 A1 | 10/2003 | Hong et al. | |
| 2004/0137960 A1 | 7/2004 | Chung | |
| 2005/0078836 A1 | 4/2005 | Ou | |

OTHER PUBLICATIONS

International Search Report; PCT app. No. PCT/US04/36545; Mar. 17, 2006; 3 pages.
Written Opinion of the International Searching Authority; PCT app. No. PCT/US04/36545; Mar. 17, 2006; 3 pages.
Notification of Transmittal of the International Search Report; PCT app. no. PCT/US04/36545; Mar. 17, 2006; 1 page.

* cited by examiner

*Primary Examiner*—Brian Ensey
(74) *Attorney, Agent, or Firm*—Townsend and Townsend and Crew LLP

(57) ABSTRACT

A modular personal audio set and related system of use is disclosed. The modular personal audio set has a connector for detachably securing different mating-fittings for engaging jacks of different audio products is disclosed. Preferably, the personal audio set is a headset and the connector is positioned along a wire that extends from the mating fitting to the audio driver of the personal audio set. More preferably, the connector also has a microphone and microphone activation button thereon.

23 Claims, 6 Drawing Sheets

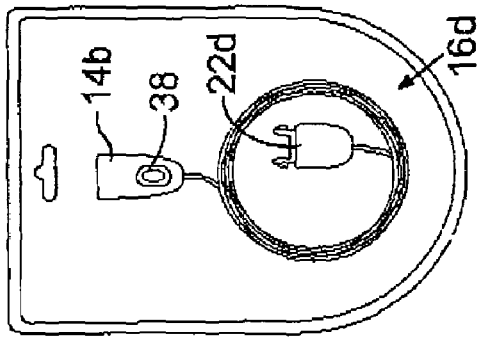
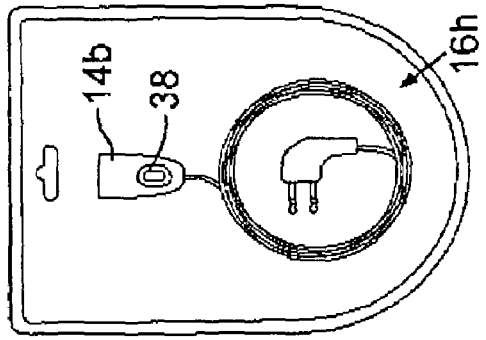
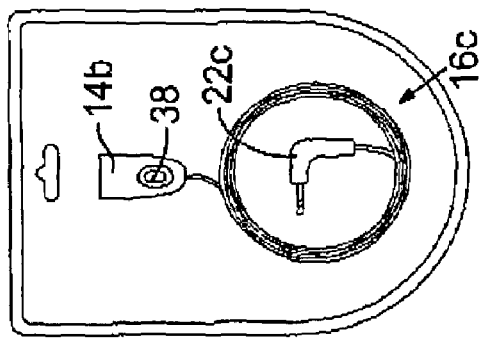
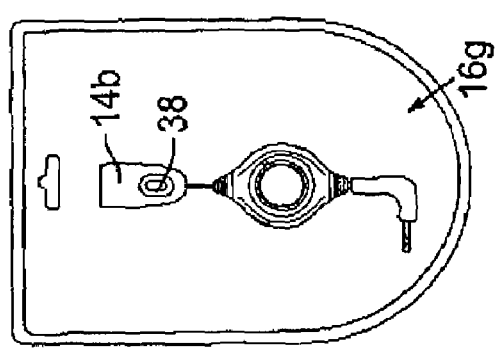
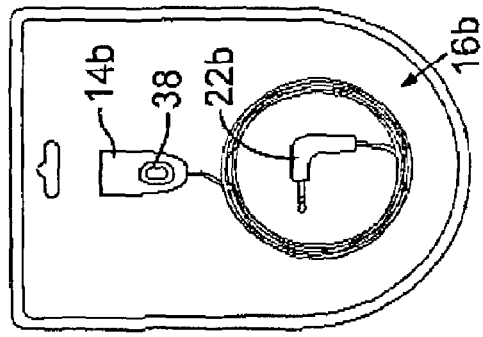
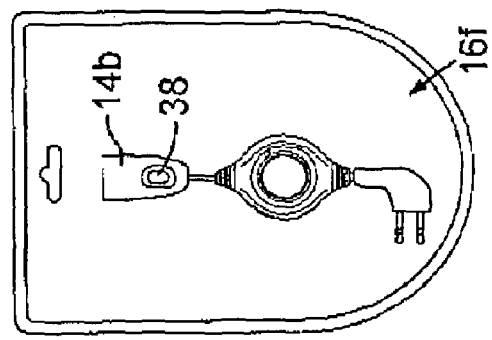
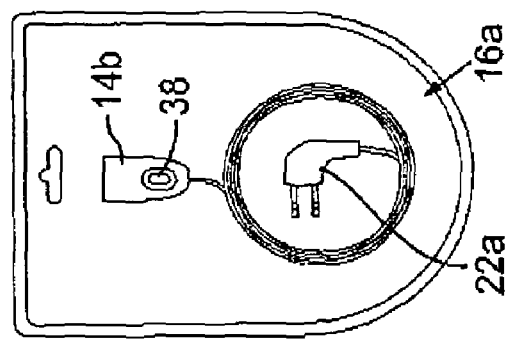
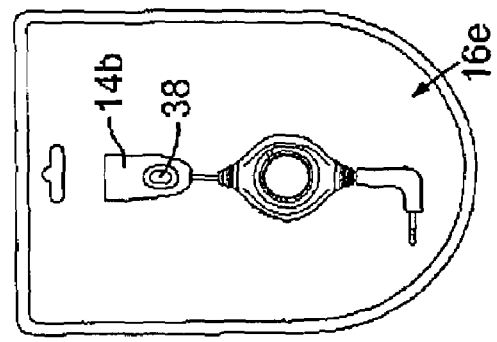
FIG. 6

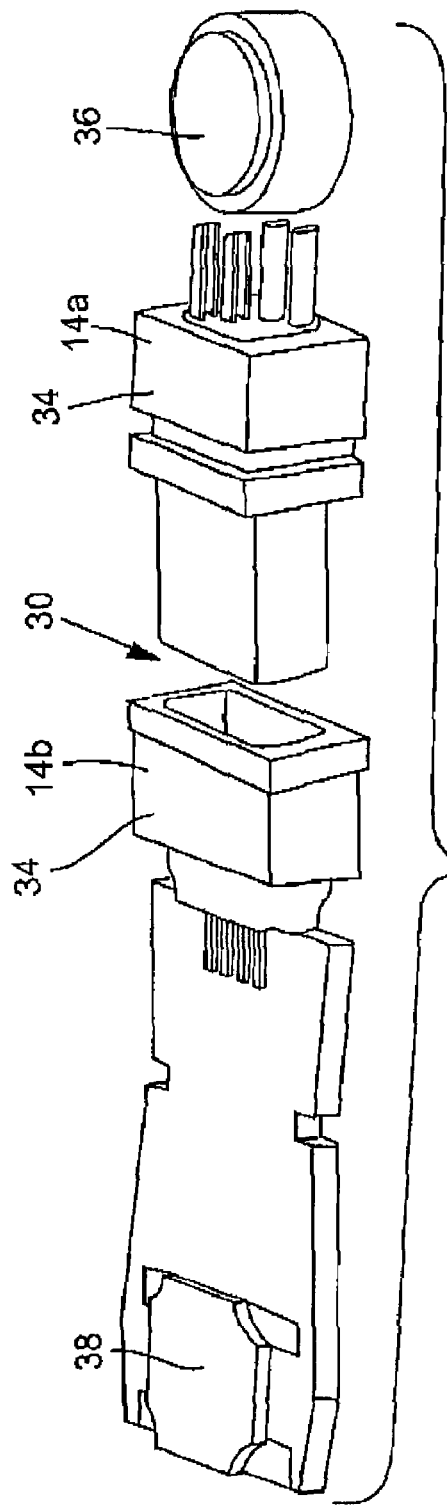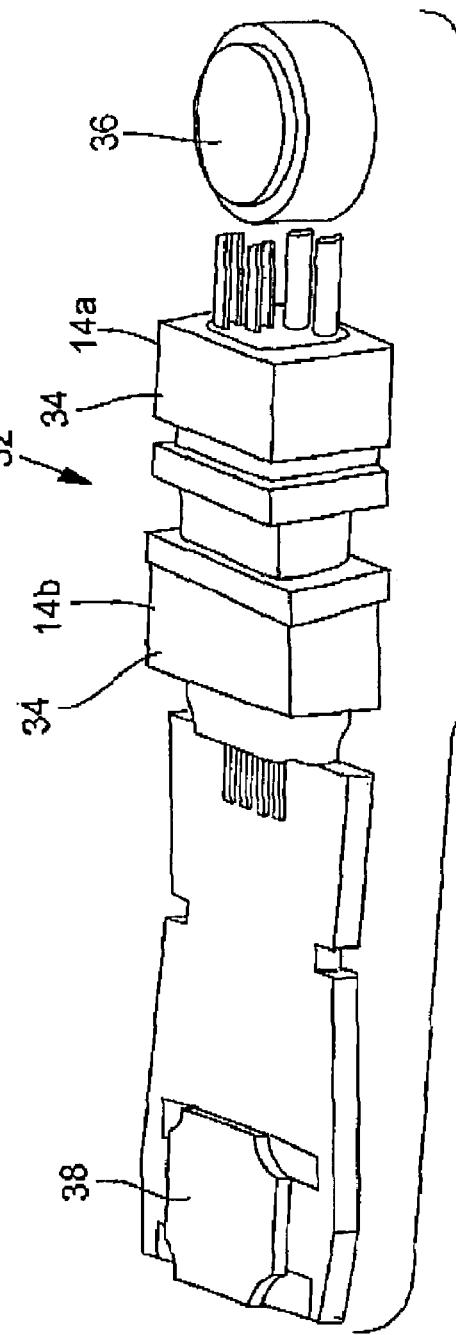

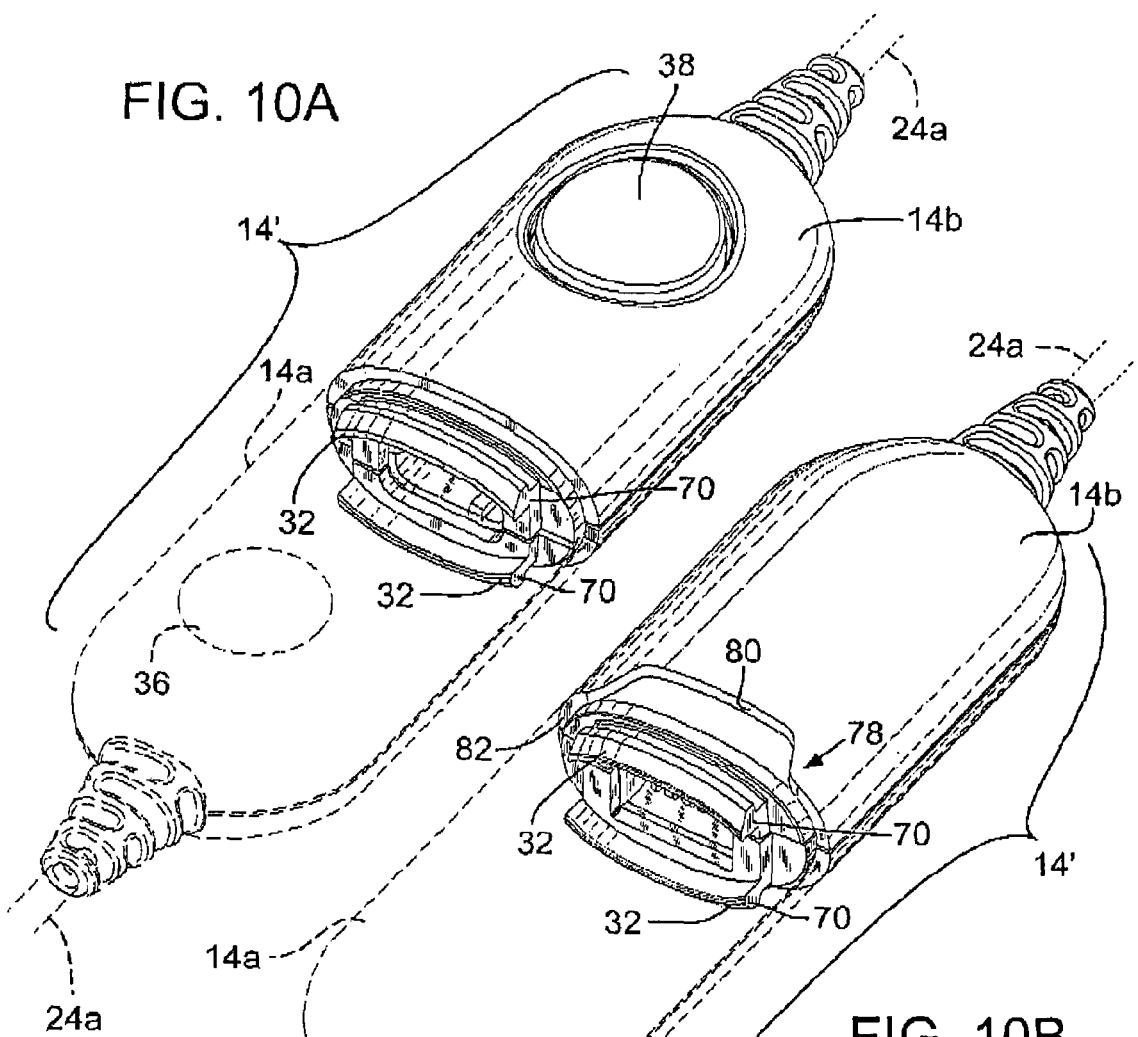
FIG. 10A
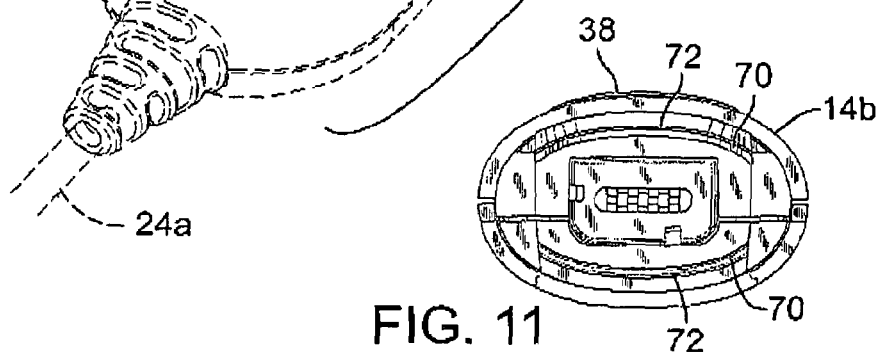
FIG. 10B
FIG. 11

MODULAR PERSONAL AUDIO SET AND SYSTEM

CROSS REFERENCE TO RELATED APPLICATION

This application claims priority to U.S. Provisional Patent Application Ser. No. 60/517,223, filed on Oct. 31, 2003.

FIELD OF THE INVENTION

The present invention relates to a modular personal audio set that includes a connector for detachably securing different shaped personal audio product matting fittings thereto.

BACKGROUND OF THE INVENTION

Personal audio-sets, commonly known as headphones, earphones, headsets, and the like, are gaining in popularity. The typical personal audio-set includes a frame containing an audio driver that is usually positioned over or in a wearer's ear. In cases where the audio-set is a headset, a microphone is also typically positioned near the wearer's mouth.

Personal audio-sets are often sold as after-market items for use with audio products that consumers have purchased separately. These audio products usually include a jack or connector that allow for connection of such personal audio-sets. Usually, different manufacturers of a type of audio product have different shaped and/or configured jacks. Accordingly, a purchaser of a personal audio-set usually must purchase an audio-set having the correctly sized and shaped mating fitting to engage the particular jack of their particular audio product.

For example, headsets for use with cellular phones and the like are gaining in popularity. In addition to selecting a headset with the desired style and functions, a purchaser must also limit his or her selection to only those makes and models that have a mating fitting that operably engages the jack of their cellular phone. Since there are a large number of cellular phone models and manufacturers, many of which have different sized and shaped jacks, many stores limit their inventories to only one or two headsets with a particularly shaped and configured mating fitting. Accordingly, a customer's range of available headset choices is often unduly limited.

Moreover, should a customer ever replace their cellular phone with a newer model, and their new cellular phone have a different shaped and/or configured jack than their older phone, a customer must purchase an entirely new headset since their older headset will no longer connect to the new cellular phone. Similarly, a headset customer may not be able to use their headset with other headset-compatible audio products, such as their wired or wireless home telephones, because the headset's mating fitting is incompatible with the other headset-compatible audio products.

SUMMARY OF THE INVENTION

Accordingly, despite the available improvements offered by personal audio-set sets, there remains a need for a lightweight, cost-effective, and stylish personal audio-set that can be connected to a large number of different sized and shaped audio jacks. In addition to other benefits that will become apparent in the following disclosure, the present invention fulfills these needs.

The present invention is a modular personal audio set that includes a connector for detachably securing different mating-fittings for engaging the jack of different audio products. Preferably, the personal audio set is a headset and the connector is positioned along a wire that extends from the mating fitting to the audio driver of the personal audio set. More preferably, the connector also has a microphone and microphone activation button thereon.

BRIEF DESCRIPTION OF THE DRAWINGS

FIG. 6 is a front view of a plurality of audio-component connection modules in accordance with preferred embodiments of the present invention.

FIG. 7 is a fragmentary, schematic diagram of the engaging structures of a possible connector for detachably securing the audio-set module to the audio-component connection module showing a possible disengaged position.

FIG. 8 is a fragmentary, schematic diagram of the engaging structures of FIG. 7 showing a possible engaged position.

FIG. 10A is an enlarged, right, top, isometric view of a portion of a connector in accordance with an alternative embodiment of the present invention showing a possible connection with a mating connector in hidden lines.

FIG. 10B is an enlarged, left, bottom, isometric view of the portion of the connector of FIG. 10A.

FIG. 11 is a front elevation view of the portion of the connector of FIG. 10A.

DETAILED DESCRIPTION OF PREFERRED EMBODIMENTS

Figure 1:
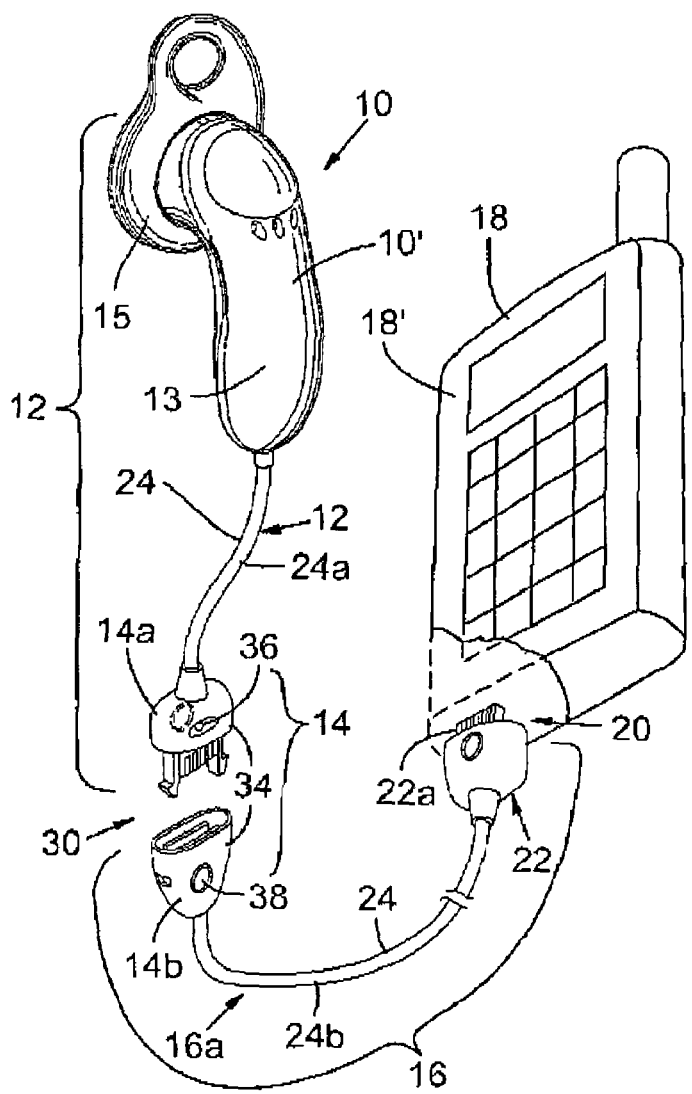
FIG. 1 is an isometric view of a modular personal audio set in accordance with an embodiment of the present invention showing a first possible audio-component connection module connected to an exemplar audio product.
Figure 2:
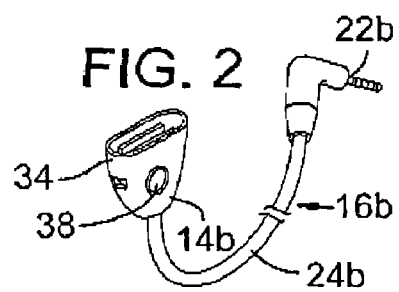
FIG. 2 is an isometric view of a second possible audio-component connection module having an alternative mating fitting thereon.
Figure 3:
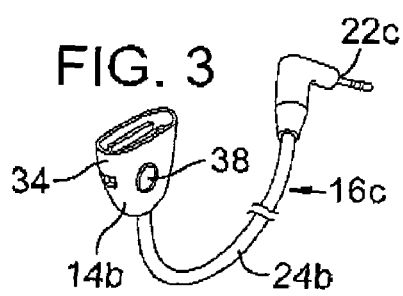
FIG. 3 is an isometric view of a third possible audio-component connection module having an alternative mating fitting thereon.
Figure 4:
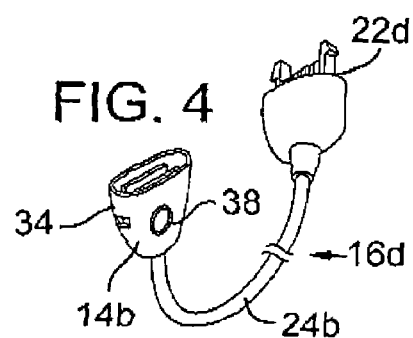
FIG. 4 is an isometric view of a fourth possible audio-component connection module having an alternative mating fitting thereon.

A modular personal audio set 10, such as a headphone, earphone, or headset 10', that includes a personal audio-set module 12 detachably secured at a connector (14, FIG. 1) (14', FIGS. 10A, 10B) to one of a plurality of audio-product connection modules 16 is shown in FIGS. 1-11.

Preferably, the personal audio-set module 12 has a frame 13 for operably engaging a wearer's ear, and at least one audio driver operably secured to the frame so as to align the audio driver 15 with the wearer's ear canal when the personal audio-set is worn by a user.

More preferably, the personal audio-set 10 is a headset 10' and the audio product 18 is a cellular phone 18' or the like as shown in FIG. 1. The general operation, connection, and use of personal audio-sets 10 and audio products 18 are well understood. Usually, the audio product 18 has a jack 20 or the like thereon that allows an after market personal audio set 10, such as a headset 10' or the like, to be detachably secured thereto usually through an audio-product mating fitting 22 connected to a wire or cable 24 running from the frame 13 to the audio product 18. Such connection and structures for allowing the personal audio set 10 to operate and communicate with the audio product 18 are well understood.

The present invention includes a connector 14, preferably positioned along the cable 24 extending between the frame 13 and the audio-product mating fitting 22. The connector 14 preferably has a first portion 14a and a second portion 14b that detachably secure together and electrically engage each other thereby forming a continuous and secure electrical connection from the audio product 18 to the personal audio-set 10. Accordingly, the audio-set 10 and portion 24a of the cable 24 leading to the first portion 14a define the audio set module 12, and the audio-product mating fitting 22 and portion 24b of the cable 24 leading to the second portion 14b of the connector 14 define the audio-product connection module 16.

Preferably and as best shown in FIGS. 1-4 and 6, a plurality of audio-product connection modules 16a-16h are produced. Each module 16a-h includes the second portion 14b of the connector 14 at one end of the cable portion 24b and at the opposite distal end of the cable portion 24b a different mating fitting 22a-h for operably engaging the connection jack 20 of a particular make and/or model of an audio product 18, such as a cellular phone 18' or the like.

An exemplar fragmentary, schematic diagram of the engaging structures of a possible connector 14 in a detached configuration 30 is shown in FIG. 7. The same connector 14 in an engaged position 32 is shown in FIG. 8.

Figure 9:
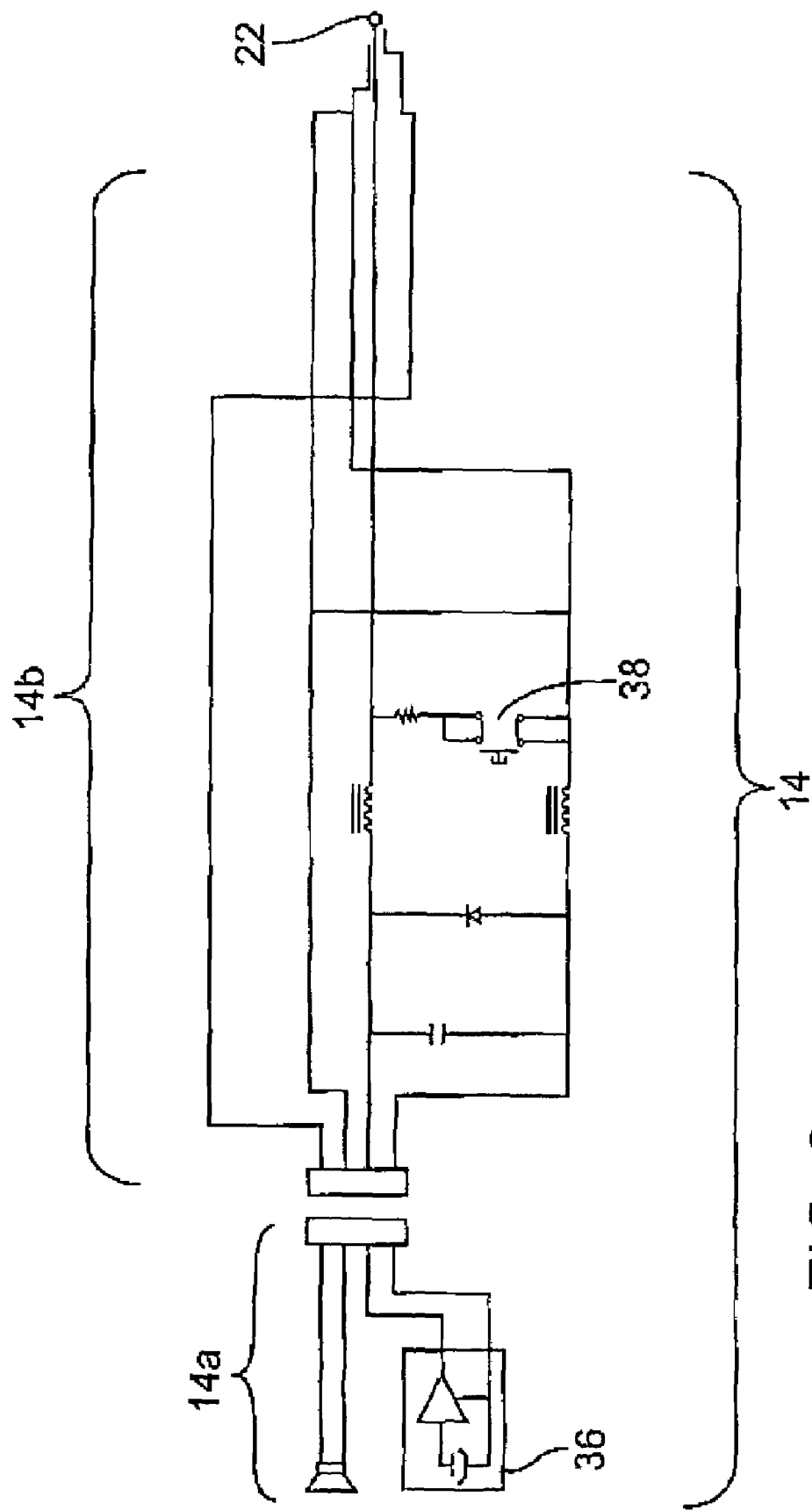
FIG. 9 is an exemplar schematic electrical diagram of the connector of FIG. 7.

More preferably, the connector 14 is formed of a compact frame 34 and positioned along the cable 24 to align with a user's mouth when the audio set 10 is being worn, and the frame 34 also includes the microphone 36 and an activation switch 38 secured thereto. An exemplar electrical circuit diagram showing a possible connection between the first and second portions 14a, 14b is shown in FIG. 9. Such electrical structures for enabling the microphone and switch to operably engage the personal audio device are known.

Even more preferably, the microphone 36 is secured to the first portion 14a of the connector 14 and the activation switch 38 is secured to the second portion 14b of the connector 14 as best shown in FIG. 1.

Figure 5:
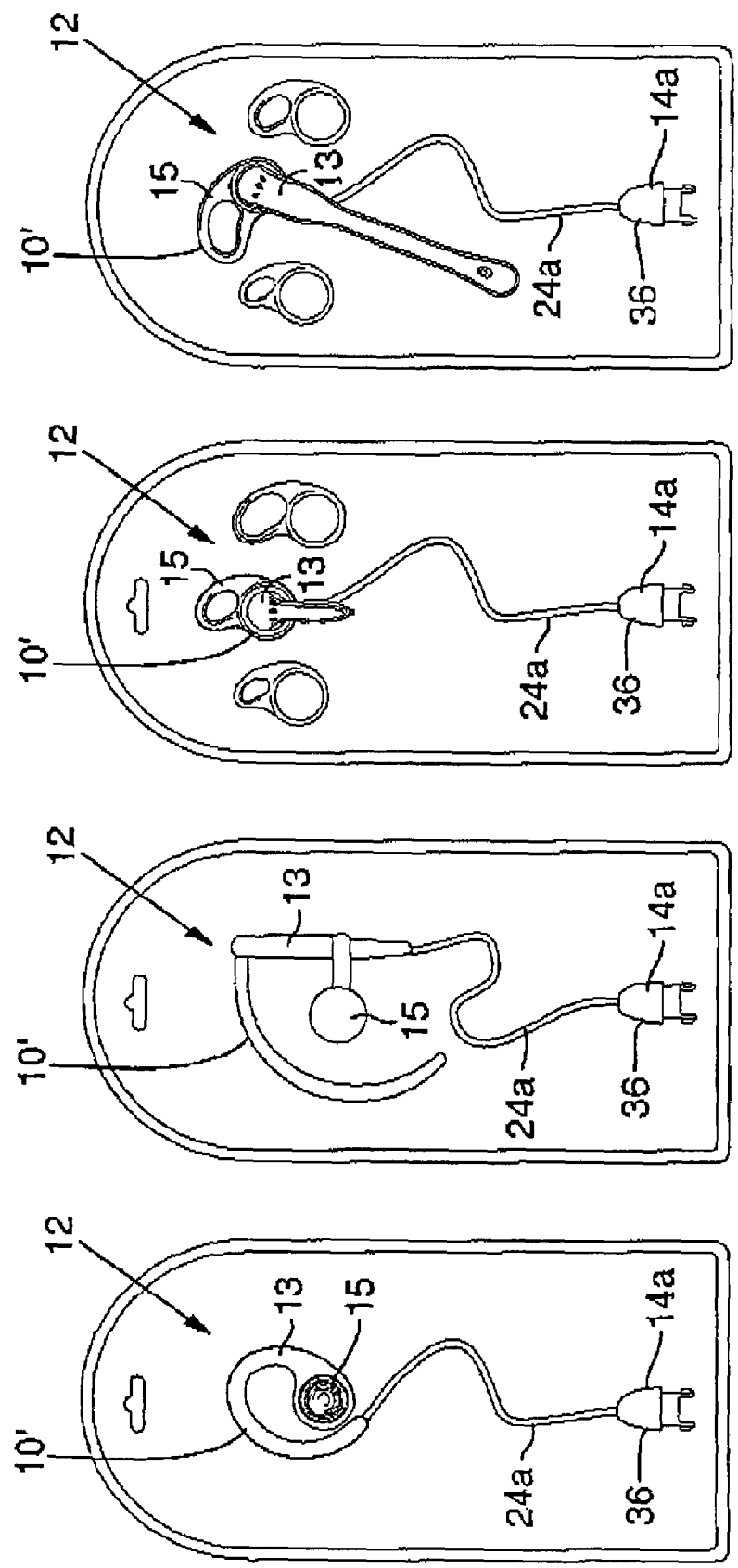
FIG. 5 is a front view of a plurality of personal audio-set modules in accordance with preferred embodiments of the present invention.

As best shown in FIGS. 5 & 6, the modular construction of the personal audio-set 10 allows a customer to first select a desired personal audio-set module 12 having the desired styling and features. Then, a user selects an audio-product connection module 16a-h having the correct mating fitting 22 to operably engage the jack 20 on the customer's audio product 18. The customer connects together the mating first and second portions 14a, 14b of the connector 14 to complete and use the personal audio set 10.

Such modular construction allows manufacturers and retailers of personal audio sets to reduce inventory and or "skew" numbers, while still increasing the choices of available products for consumers. Moreover, should a customer ever replace their audio product 18 with a one having a different sized or configured jack 20, the customer need only replace the audio-product connection module 16 with one having the correctly sized and configured mating-fitting 22 without the need to replace the entire personal audio set 10.

Referring to FIGS. 10A & 10B, an alternative connector embodiment is disclosed. In this embodiment, the first and second portions 14a, 14b, respectively, of the connector 14' are detachably secured together by a pair of spaced apart elongate flanges 70 extending from one of the first and second portions (first portion 14a is shown in FIGS. 10A & 10B). The flanges 70 include hook portions 72 at their distal ends 74 that operably engage mating recesses (not shown) in the other of the first and second portions (second portion 14b is shown in FIGS. 10A & 10b). Preferably, a key structure 78, such as a recess 80 in one of the first and second portions (14a is shown in FIGS. 10a & 10b) and a mating protrusion 82 in the other of the first and second portion (14b is shown in hidden lines in FIGS. 10a & 10b) is provided to ensure proper connection of the two portions 14a, 14b together. The key structure 78 also serves as a visual reference to a user during the connection process.

Having described and illustrated the principles of our invention with reference to a preferred embodiment thereof, it will be apparent that the invention can be modified in arrangement and detail without departing from such principles. In view of the many possible embodiments to which the principles may be put, it should be recognized that the detailed embodiment is illustrative only and should not be taken as limiting the scope of our invention. Accordingly, we claim as our invention all such modifications as may come within the scope and spirit of the following claims and equivalents thereto.

We claim:

1. A personal audio set for an audio device, the audio device having a jack for operably connecting the personal audio set thereto; the personal audio set comprising:
   a personal audio-set module having a frame and at least an audio driver operably secured to the frame;
   a plurality of audio-product connection modules, each audio-product connection module having a different shaped audio-product mating fitting to engage the jack on a different audio device, such that said personal audio set module can operably engage a plurality of different audio devices, wherein each of the different shaped audio-product mating fitting of each of the audio-product connection modules enables compatibility with a single type of audio device; and
   a detachable connector for operably connecting the audio-product mating fitting to the driver and detachably securing the personal audio-set module to the audio-product connection module, wherein the same detachable connector secures the personal audio-set module to the audio-product connection module for each of the audio-product connection modules.

2. The personal audio set for an audio device of claim 1, further including a wire extending from the audio-product mating fitting to the frame, and said detachable connector is operably secured to the wire.

3. The personal audio set for an audio device of claim 2, wherein said connector includes a first portion and a second portion, and said first portion is rigidly secured to the audio-product mating fitting thereby defining the audio-product connection module, and said second portion is rigidly secured to the frame thereby defining the personal audio-set module.

4. The personal audio set for an audio device of claim 1, further including a plurality of personal audio-set modules, each having a different sized and shaped frame thereon, wherein each personal audio set module of said plurality of different personal audio-set modules can be installed on said personal audio device by operably securing said connector.

5. The personal audio set for an audio device of claim 1, further including:
   a wire extending from the audio-product mating fitting to a first portion of said connector; and, a wire extending from said frame to a second portion of said connector such that detachably securing said first portion of the connector to said second portion of the connector operably connects said audio-product mating fitting to said audio driver.

6. The personal audio set for an audio device of claim 1, wherein said personal audio set module includes a headset.

7. The personal audio set for an audio device of claim 1, wherein said audio device is a cellular phone, and said personal audio set is a headset.

8. The personal audio set for an audio device of claim 1, wherein said connector including a first portion and a second portion, and said first portion has a plurality of flanges extending therefrom, each said flange includes a hook portion on its distal end that operably engaging a mating recess on said second portion thereby detachably securing said first and said second portions together.

9. A personal audio set for an audio device, the audio device having a jack for operably connecting the personal audio set thereto; the personal audio set comprising:
　a personal audio-set module having a frame and at least an audio driver operably secured to the frame;
　an audio-product connection module having an audio-product mating fitting for operably engaging the jack of the audio device;
　a detachable connector for operably connecting the audio-product mating fitting to the driver and detachably securing the personal audio-set module to the audio-product connection module;
　wherein a first portion of said detachable connector includes a microphone, and wherein a second portion of said detachable connector includes an activation switch for the microphone, and wherein the first portion of said detachable connector and the second portion of said detachable connector are on distal ends of the detachable connector.

10. The personal audio set for an audio device of claim 9, further including a wire extending from the audio-product mating fitting to the frame, and said detachable connector is operably secured to the wire.

11. The personal audio set for an audio device of claim 10, wherein said connector includes a first portion and a second portion, and said first portion is rigidly secured to the audio-product mating fitting thereby defining the audio-product connection module, and said second portion is rigidly secured to the frame thereby defining the personal audio-set module.

12. The personal audio set for an audio device of claim 9, further including a plurality of personal audio-set modules, each having a different sized and shaped frame thereon, wherein each personal audio set module of said plurality of different personal audio-set modules can be installed on said personal audio device by operably securing said connector.

13. The personal audio set for an audio device of claim 9, further including:
　a wire extending from the audio-product mating fitting to said first portion of said connector; and,
　a wire extending from said frame to said second portion of said connector such that detachably securing said first portion of the connector to said second portion of the connector operably connects said audio-product mating fitting to said audio driver.

14. The personal audio set for an audio device of claim 9, wherein said personal audio set module includes a headset.

15. The personal audio set for an audio device of claim 9, wherein said audio device is a cellular phone, and said personal audio set is a headset.

16. The personal audio set for an audio device of claim 9, said first portion of the connector has a plurality of flanges extending therefrom, each said flange includes a hook portion on its distal end that operably engaging a mating recess on said second portion of the connector thereby detachably securing said first and said second portions together.

17. A personal audio set for an audio device, the audio device having a jack for operably connecting the personal audio set thereto; the personal audio set comprising:
　a personal audio-set module having a frame and at least an audio driver operably secured to the frame;
　an audio-product connection module having an audio-product mating fitting for operably engaging the jack of the audio device;
　a detachable connector for operably connecting the audio-product mating fitting to the driver and detachably securing the personal audio-set module to the audio-product connection module;
　a wire extending from the audio-product mating fitting to a first portion of said connector; and
　a wire extending from said frame to a second portion of said connector such that detachably securing said first portion of the connector to said second portion of the connector operably connects said audio-product mating fitting to said audio driver, wherein said first portion of the connector includes a microphone activation switch therein; and said second portion of the connector includes a microphone therein.

18. The personal audio set for an audio device of claim 17, wherein said connector includes a first portion and a second portion, and said first portion is rigidly secured to the audio-product mating fitting thereby defining the audio-product connection module, and said second portion is rigidly secured to the frame thereby defining the personal audio-set module.

19. The personal audio set for an audio device of claim 17, further including a plurality of personal audio-set modules, each having a different sized and shaped frame thereon, wherein each personal audio set module of said plurality of different personal audio-set modules can be installed on said personal audio device by operably securing said connector.

20. The personal audio set for an audio device of claim 17, wherein said
　personal audio set module includes a headset.

21. The personal audio set for an audio device of claim 17, wherein said audio device is a cellular phone, and said personal audio set is a headset.

22. The personal audio set for an audio device of claim 17, wherein said first portion has a plurality of flanges extending therefrom, each said flange includes a hook portion on its distal end that operably engaging a mating recess on said second portion thereby detachably securing said first and said second portions together.

23. A headset for a cellular phone, the cellular phone having a jack for operably connecting the headset thereto; the headset comprising:
　a personal audio-set module having a frame and at least an audio driver operably secured to the frame;
　a plurality of audio-product connection modules, each audio-product connection module having a different shaped audio-product mating fitting to engage the jack on a different cellular phone, such that said headset module can operably engage a plurality of different cellular phones, wherein each of the different shaped audio-product mating fitting of each of the audio-product connection modules enables compatibility with a single type of cellular phone;

a detachable connector for operably connecting the audio-product mating fitting to the driver and detachably securing the personal audio-set module to the audio-product connection module, wherein the same detachable connector secures the personal audio-set module to the audio-product connection module for each of the audio-product connection modules;

a microphone operably secured to a first portion of said detachable connector; and an activation switch for the microphone operably secured to a second portion of said detachable connector, wherein the first portion of said detachable connector and the second portion of said detachable connector are on opposing sides of the detachable connector.

* * * * *